Patented Jan. 21, 1941

2,229,049

UNITED STATES PATENT OFFICE 2,229,049

AZO PIGMENT

Miles A. Dahlen and Crayton K. Black, Wilmington, Del., assignors to E. I. du Pont de Nemours & Company, Wilmington, Del., a corporation of Delaware No Drawing. Application August 5, 1937,
Serial No. 157,543

1 Claim. (Cl. 260—201)

This invention relates to organic pigments, to dyes from which they are made, and to means of making the pigments and the dyes.

Three properties which are of great importance in pigments are brightness, strength, and masstone, terms which have a meaning well-known to persons skilled in the art. There are made at the present time many azo dyestuff pigments. Some of these are insoluble pigments made by coupling typical azo ingredients which produce colors insoluble in water. Others are produced by making an azo dye with acid groups and thereafter making a salt thereof. Salts of the heavy metals are frequently used in this way. Although of general excellent properties, these pigments are far from being perfect in their properties. Some of them are too weak in tint; others lack sufficient brightness of masstone; and others lack depth so that they perform but indifferently well when included in compositions. Among these pigments those made from a diazo component of the benzene series form a class which has notoriously weak members. Attempts have been made to improve compounds of this type by increasing the azo groups and the other aryl nuclei and by other means, but these methods tend more to the formation of strictly new compounds than to the improvement of pigments formed from the original compounds.

It is an object of this invention to make improved azo pigments having a diazo component of the benzene series, and to make lakes of the members of this class which, by the presence of lake-forming groups, are suitable for laking.

The objects of the invention are accomplished, generally speaking, by replacing a small portion of the diazo component consisting of the diazotized primary arylamine of the benzene series with a different diazotized primary arylamine. The two ingredients may be combined before diazotization and diazotized jointly or they may be diazotized separately and combined before coupling to the coupling component. In this invention typical azo dyestuff coupling components are used.

In the preferred form of the invention the diazotized arylamines are present in the proportion of upwardly of 90% of primary diazo component, the balance to 100% being made up by the added diazo compound. The added diazo compound is preferably of the benzene or naphthalene series. Greater or less amount of the added compounds may be used, however. In this regard it is interesting to note that the best results are most frequently obtained by the addition of 5% to 7% of the modifier. It is guessed that either a mixed crystal is formed or that the accessory agent alters only the physical form of the precipitated pigments, but no attempt is made to put a definite limitation to this phenomenon. The compounds formed by this process may be laked in the usual way, if laking groups are present, and a wide variety of tinctorial effects is produced. The new pigments have greatly improved characteristics. They are darker, deeper in masstone and stronger in tint than dyes made from the primary azo color alone.

The following examples illustrate but do not limit the invention.

Example I 40 parts of 2-chlor-5-amino-toluene-4-sulfonic acid and 4 parts 2-amino-toluene-4-sulfonic acid were dissolved in 600 parts water by the addition of 8 parts sodium hydroxide. Solution was completed at 70° C. This solution was precipitated by pouring into 18.5 parts of 100% hydrochloric acid and ice to cool to 5° C. Diazotization was effected by the addition of 13.8 parts of sodium nitrite. This diazo was added to a cooled solution of 30 parts beta-naphthol, 200 parts water and 9 parts sodium hydroxide. The dye was isolated by filtration. It may be dried and used as an orange pigment or may be converted to the barium (or other lake-forming-metal) salt by the usual methods of lake manufacture. As a pigment it is much darker and deeper in masstone and stronger in tint than the corresponding dye made from the primary azo component alone.

Example II 9 parts of p-toluidine-m-sulfonic acid and 1 part of 4-amino-toluene-2-sulfonic acid were dissolved in 160 parts water by the addition of 2 parts sodium hydroxide. This material was diazotized at 0° C. By the addition of 5 parts 100% hydrochloric acid and 3.45 parts sodium nitrite. In a separate container 10.3 parts of 2-hydroxy-3-naphthoic acid were dissolved in 185 parts water by the addition of 2.25 parts sodium hydroxide. 8 parts of sodium carbonate were added just prior to coupling. The diazo body was added over 30 minutes. The isolated color was converted to the calcium salt by the usual laking methods. This pigment is deeper and brighter in masstone, brighter and stronger in tint than the color made from p-toluidene-m-sulfonic acid alone.

Example III 1 part o-toluidine-m-sulfonic acid was substituted for the 4-amino-toluene-2-sulfonic acid in Example II. The resulting pigment is dark and deep in masstone but yellow and strong in tint. In a similar manner orthotoluidine-p-sulfonic acid and meta-toluidine-o-sulfonic acid were used as accessory agents with this color.

*Example IV*

74 parts ortho-toluidine-meta-sulfonic acid and 8 parts para-toluidine-meta-sulfonic acid were dissolved in 340 parts water by the addition of 19.5 parts sodium hydroxide. This material was diazotized and coupled to beta-naphthol as in Example I. The dye was converted to the barium salt by the usual methods. The resulting pigment is darker in masstone and redder in tint than pigment made from the single intermediate. In a similar way para-toluidine-ortho-sulfonic acid, ortho-toluidine-para-sulfonic acid and meta-toluidine-ortho-sulfonic acid were used as accessory agents.

*Example V*

93 parts 4-chlor-aniline-2-sulfonic acid and 10 parts 4-amino-toluene-2-sulfonic acid were diazotized and coupled to 2-hydroxy-3-naphthoic acid in the regular manner. The strontium salt of this color is darker in masstone and much bluer in shade than a toner made from a single first component. In a similar manner para-chlor-aniline-meta-sulfonic acid, 2-chlor-4-amino-toluene-5-sulfonic acid, para-toluidine-meta-sulfonic acid and para-chlor-aniline were used as accessory agents.

*Example VI*

10 parts of 2-chlor-4-amino-toluene-5-sulfonic acid and 1.1 parts of 6-chlor-2-amino-toluene-4-sulfonic acid were dissolved in 100 parts hot water by the addition of 2.15 parts sodium hydroxide. The solution was acidified with 5 parts 100% hydrochloric acid and iced to 0° C. Diazotization was effected by the addition of 3.5 parts of sodium nitrite.

10 parts of 2:3-oxy-naphthoic acid were dissolved in 100 parts of hot water by the addition of 3 parts of sodium hydroxide. 7.5 parts of sodium carbonate were added and the mixture cooled to 18° C. Coupling was effected in the usual manner by adding the diazo component to the 2:3-oxy-naphthoic acid. The dye precipitated out as formed and was finished by heating to 65° C. and filtering.

The isolated soda salt was reslurried in 2300 parts of water at the boil. 25 parts of calcium chloride in 250 parts water were added during 5 minutes. Boiling was continued for 10 minutes after which the pigment was filtered, washed, and dried.

The resulting pigment was very dark, bright in masstone, yellow and strong in shade vs. a control made with 100% 2-chlor-4-amino-toluene-5-sulfonic acid.

*Example VII*

152 parts of meta-nitro-para-toluidine and 138 parts of ortho-nitro-aniline were slurried in 1000 parts of water and 170 parts of 100% hydrochloric acid. The mixture was cooled with ice to 5° C. and diazotized in the usual manner with 138 parts of sodium nitrite. When diazotization is complete the clear diazo solution may be separated from suspended solids by filtration and added slowly to a suspension of 362 parts of acetoacet-anilide in 4000 parts of water in which are dissolved 408 parts of sodium acetate. When coupling is complete the pigment is stirred 1 hour, filtered, washed until the filtrate is neutral to blue litmus and dried. The color is much stronger than one made without o-nitro-aniline.

*Example VIII*

159 parts of p-chlor-o-nitro-aniline and 11 parts of o-nitro-aniline were slurried in 1200 parts of water and 92 parts of 100% hydrochloric acid. The mixture was cooled with ice to 15° C. and diazotized in the usual manner with 69 parts of sodium nitrite. When diazotization is complete, the clear diazo solution may be separated from suspended solids by filtration and added slowly to a suspension of 212 parts of acetoacet-o-chlor-anilide in 5000 parts of water in which were dissolved 110 parts of sodium formate. When coupling is complete the pigment is stirred 1 hour, filtered, washed until the filtrate is neutral to blue litmus and dried. The color is much stronger than the one made without o-nitro-aniline.

*Example IX*

42 parts 2-chlor-5-amino-toluene-4-sulfonic acid were dissolved in 475 parts water and 8.1 parts sodium hydroxide. This solution was added to ice and 72 parts of 100% hydrochloric acid. To this was added 2.2 parts of para-nitro-aniline in 2 parts of 100% hydrochloric acid. The mixture was diazotized by the addition of 13.8 parts sodium nitrite. Coupling and finishing were effected as in Example I. The resulting pigment is light and bright in masstone vs. a control containing no para-nitro-aniline.

*Examplt X*

2.2 parts of alpha-naphthylamine were substituted for the 2.2 parts of para-nitro-aniline in Example IX: The resulting pigment is very dark in masstone and blue in shade vs. a control.

*Example XI*

42 parts 2-chlor-5-amino-toluene-4-sulfonic acid and 2.2 parts of 2-naphthylamine-1-sulfonic acid were diazotized and coupled as in Example I. The resulting pigment is light and bright in masstone and blue in shade vs. a control made from the primary azo component alone.

Among the satisfactory azo dyestuff coupling components are compounds of the benzene, naphthalene, acetoacetanilide, para-tolylene-diamine, and aryl-alkyl-pyrazolone series, among which 1-phenyl-3-methyl-5-pyrazolene, acetoacet-anilide, and beta-naphthol are noteworthy.

As many apparently widely different embodiments of this invention may be made without departing from the spirit and scope thereof, it is to be understood that we do not limit ourselves to the specific embodiments thereof except as defined in the appended claim.

We claim:

A dyestuff formed by coupling 2-hydroxy-3-naphthoic acid with a composition of matter having diazo ingredients consisting in each one hundred parts of 93–95 parts of diazotized para-toluidine-meta-sulfonic acid and a balance of diazotized 4-amino-toluene-2-sulfonic acid.

MILES A. DAHLEN.
CRAYTON K. BLACK.